United States Patent [19]

Beaver

[11] Patent Number: 4,778,499

[45] Date of Patent: Oct. 18, 1988

[54] METHOD OF PRODUCING POROUS HOLLOW SILICA-RICH FIBERS

[75] Inventor: Richard P. Beaver, Library, Pa.

[73] Assignee: PPG Industries, Inc., Pittsburgh, Pa.

[21] Appl. No.: 876,321

[22] Filed: Jun. 19, 1986

Related U.S. Application Data

[63] Continuation-in-part of Ser. No. 685,821, Dec. 24, 1984, abandoned.

[51] Int. Cl.⁴ ............................................. C03C 25/06
[52] U.S. Cl. ............................................. 65/2; 65/31; 501/38; 501/54
[58] Field of Search ..................... 65/2, 31; 501/38, 54

[56] References Cited

U.S. PATENT DOCUMENTS 2,494,259  1/1950  Nordberg .
3,268,313  8/1966  Burgman et al. ..................... 65/2 X
4,042,359  8/1977  Schnaebel et al. ........................ 65/2

Primary Examiner—Robert L. Lindsay
Attorney, Agent, or Firm—Kenneth J. Stachel

[57] ABSTRACT

Porous, hollow, silica-rich fibers with good alkaline tolerance are produced from hollow glass fibers of an alkali metal borosilicate glass having one or more oxides of a metal of Group IV of the Periodic Table in an amount of about 1 to about 20 weight percent of the glass composition. The hollow porous silica-rich fibers are produced by acid leaching where the hollow glass fibers have greater than 25 weight percent extractable components, less than 25 weight percent extractable components but a wall thickness of less than 15 microns, or less than 25 weight percent extractable components and a fiber diameter of less than 25 microns. In addition, heat treating can be used for hollow glass fibers having greater than 25 weight percent extractable components to enlarge the pores.

22 Claims, No Drawings

METHOD OF PRODUCING POROUS HOLLOW SILICA-RICH FIBERS

This application is a continuation-in-part application of application Ser. No. 685,821, filed Dec. 24, 1984, now abandoned.

The present invention is directed to a method of producing hollow, porous, silica-rich fibers, which in some cases have large enough diameters to be capillaries or tubes with good alkaline tolerance and the so-produced porous hollow glass fibers.

Hollow glass fibers were originally produced as single fibers by flame drawing a preformed glass tube into fiber dimensions. In U.S. Pat. Nos. 3,268,313; 3,421,873 and 3,510,393 (Burgman et al.) methods and apparatus were taught for producing a plurality of hollow glass fibers and strands of hollow glass fibers by mechanical attenuation. Hollow glass tubes with diameters of around 40 microns to 180 microns were prepared into pourous hollow tubes in accordance with the teachings of U.S. Pat. No. 4,042,359. The porous hollow glass tubes were produced by heat treating for phase separation of phase separable borosilicate glass followed by leaching with acids and/or alkali material to produce pores in the hollow glass tubes. The alkali leaching extracts some silica to produce greater porosity in the tubes from 11 A to 50 A. The borosilicate glass compositions were those as taught in U.S. Pat. Nos. 2,215,039; 2,221,709 and 2,286,275 (Hood et al.). In these patents, glass fibers made from the alkali metal borosilicate ternary glass system were heat treated to phase separate the acid leachable materials from the silica and acid treated to remove the phase separated acid leachable materials.

Porous organic and inorganic fibers have been investigated for various applications such as ultrafiltration, reverse osmosis, gaseous separations, gaseous liquid separations, liquid liquid separations, salt extraction, physiological or ion exchange membranes, catalyst supports and more thermally stable, silica-rich insulation and fabrics and for use in fabrication of rocket nozzles and jet liners.

Many of the foregoing applications require specific pore volumes and/or pore diameters for efficient operation. Also some of the applications require operability in alkaline environments. As mentioned in U.S. Pat. No. 4,042,359, pore size can be enlarged by alkali leaching of the porous glass tubes to partially dissolve the silicon dioxide structure. Such a porous, glass tube would be limited to utilization in acid or neutral pH environments because of the alkaline solubility of the silica.

It is an object of the present invention to provide porous, hollow silica-rich fibers having good pore volume and having good alkaline tolerance and the method of producing the porous, hollow fibers.

SUMMARY OF THE INVENTION

The present invention accomplishes the aforementioned objects and other objects gleaned from the following disclosure by providing porous hollow, silica-rich fibers produced in the following manner.

In one aspect of the invention, the porous hollow, silica-rich fibers are produced with good porosity by forming hollow glass fibers having a K factor (inner diameter divided by outer diameter) of up to about 0.96 and having a glass composition of an alkali metal borosilicate composition having oxides of a metal from Group IVB of the Periodic Chart of Elements and extracting extractable components to produce hollow, porous, silica-rich fibers having oxides of metals of Group IVB. The components of the glass belong to either an extractable group or non-extractable group, although some components may be in associated forms so as to belong to both groups. The components of the extractable group are extracted along with any of its associated materials. The components in the extractable group include in weight percent of the glass composition the following: boric oxide ($B_2O_3$) or anhydride about 0 to about 60; and alkaline earth bivalent oxides such as calcium oxide (CaO), and magnesium oxide (MgO) 0 to about 30, and $R_2O$, where R indicates sodium or potassium trivalent oxides around 1 to about 40, and some trace materials. In addition, the extractable group can have components that are associated materials such as reaction products with or between aforementioned components of the extractable group like alkali metal borates and reaction products involving aluminum oxide. The components of the non-extractable group in weight percent of the glass composition include: silica ($SiO_2$) in an amount greater than about 25 to less than about 80, and one or more oxides like tetravalent oxides selected from zirconia oxide and titania oxide and hafnium oxide present in an amount up to about 20 weight percent of the glass composition. The components of the extractable group are removed from the hollow glass fibers with or without heat treatment depending upon whether the glass composition is phase separable and the degree of porosity desired. The product is the porous, silica-rich, zirconium-containing, titanium-containing and/or hafnium-containing, hollow fibers.

In forming the hollow glass fibers, the outer diameter can vary from around 1 to around 250 micrometers (microns). With the selection of a particular outer diameter, the inner diameter is selected to be an effective dimension that can also balance the rate of leaching contributed from the lumen and from the exterior while retarding formation of a precipitate of extracted components that can clog pores and while retarding extraction of silica.

It is a further additional aspect of the present invention to have porous, hollow fibers having improved alkali tolerance, which are produced from an alkali metal borosilicate, Group IVB metal oxide-containing fiberizable glass forming composition. The porous hollow glass fibers with improved alkaline stability can have controlled porosity by balancing the ratio of the components in the extractable and nonextractable groups. Also the components of the extractable group can be extracted with or without heat treating the glass fibers, depending on whether the glass composition is phase separable and the degree of porosity required. The pores in the hollow glass fiber can be on the exterior surface and the interior lumen surface of the hollow fiber and can actually be a channel through the wall from the exterior surface to the interior surface of the hollow fiber. Generally, the silica-rich, zirconia and/or titania- and/or hafnium-containing hollow, porous fibers have a pore volume in the range of about 0.1 to about 1.2 cc per gram.

It is an additional aspect of the present invention to produce nonporous, hollow silica-rich fibers with alkaline tolerance. The porous, silica-rich, fibers containing the oxide of the metal from the IVB Group of the Periodic Chart is consolidated by heat treatment. The temperature of heat treatment is less than the melting temperature of the glass and greater than around 450° C.

DETAILED DESCRIPTION AND PREFERRED EMBODIMENT OF THE INVENTION

For a better understanding of the invention the term "extractable" for a group of components refers to metal oxides and associated materials which are leachable from the glass fibers with or without heat treatment by water and/or acids other than hydrofluoric and phosphoric acids. These latter acids cannot be used since they attack silica. Also the term "non-extractable" for the group of components refers to silica and metal oxides of Group IVB of the Periodic Chart. These materials are not leachable from the glass by acids other than hydrofluoric and phosphoric acids. Also the terms "associated material" refers to an interconnected phase of reaction products of the components of the extractable group or the non-extractable group or of the components from both groups because of their proximity to each other in the glass fibers. Nonexclusive examples of associated materials include alkali metal borates, alkali metal aluminates, other reaction products with aluminum oxide and the like.

The porous, hollow, silica-rich fibers of the present invention are prepared from a formulated fiberizable, pore generating, glass forming batch composition. The batch composition is formulated to enable the resulting glass fibers to have a balance of the two groups of components. Typical batch materials known to those skilled in the art can be used and calculated by known methods to produce the glass compositions with the components of the two groups. In the pore generating glass fiber composition, the components and affiliated materials of the extractable group include: one or more boron-containing materials, alkali metal oxides ($R_2O$); alkaline earth metal oxides like bivalent oxides (CaO, MgO); and associated materials like that of trivalent oxides like $Al_2O_3$. In addition, trace amounts of materials usually present in trace amounts in glass fibers can also be present like fluorine and ferric oxide. The amount of the components of the extractable group in the glass fibers should be at least around 10 volume percent, and preferably at least 15 volume percent of the total glass composition. The presence of the $R_2O$ or $B_2O_3$ materials also serve as a flux in producing the glass fibers. The components of the non-extractable group include the siliceous material such as silica and refractory glass modifiers like the tetravalent oxides of zirconium and/or titanium and/or hafnium.

In the extractable group, the concentration of boron-containing material, boron oxides and/or anhydride and affiliated materials having boron, in the glass can range from about 0 to about 60 weight percent. The amount of boron-containing material should not be too great that the softening point of the glass fibers is decreased to cause the fibers to stick together during any heat treatment. This tackiness complicates the maintenance of individual fiber identity and, for discrete lengthy fibers, maintenance of any near parallel alignment during subsequent processing steps. Phase separable glass compositions that can be heat treated to engender phase separation before leaching are those having high concentrations of boron-containing materials, i.e., 20 to around 60, preferably 40 to around 60, weight percent of the total glass composition. With fibers having the higher amounts of boron-containing materials, care should be taken to avoid moisture attack before heat treatment of the fibers.

When the content of boron-containing material is around zero, another fluxing agent in an effective fluxing amount is used. For instance, the amount of alkali metal oxide ($R_2O$) becomes the major component in the extractable group. When the amount of boron-containing compound is in the range of about 4 to about 35 weight percent of the total resulting glass composition, one or more inorganic oxide components and/or one or more alkali metal oxide ($R_2O$) components, and/or one or more alkaline earth metal (RO) components can be present in the extractable group. When the amount of boron-containing material is around 40 weight percent and up to 60 weight percent of the total resulting glass composition, the boron-containing material components constitute the majority and the $R_2O$ and RO components and any aluminum oxide components of the associated materials constitute the minority of the extractable group.

Regarding the other components in the glass fiber that can be considered in the extractable group, the aluminum oxide can be present in an amount in the range of 0 to about 15 weight percent of glass composition. This amount is generally less for higher amounts of boron-containing materials in the glass fibers and larger for lower amounts of boron-containing materials in the glass fibers. The amount of the $R_2O$ components range from less than one weight percent up to around 15 weight percent, when higher amounts of boron-containing components are present. Also there can be present, especially with lower amounts of boron-containing components, one or more alkaline earth oxides such as the divalent components calcium oxide (CaO) and magnesium oxide (MgO). The total amount of these components can be in the range of 0 to 30 weight percent of the glass composition.

The amount of siliceous material should not be less than around 25 and preferably not less than 30 weight percent of the total glass composition. Generally, the siliceous material is less than around 80, preferably less than around 70 weight percent of the total glass composition. The metal oxides such as zirconium and/or titanium and/or hafnium can be present in amounts from 1 to about 20 weight percent of the glass composition. Preferably zirconium oxide is present in an amount of at least up to about 8 weight percent. Since these oxides are only slightly soluble in acid, an appreciable amount of these oxides is present with silica in the porous fiber. These metal oxides not only render porous fibers with good alkaline stability, but also enable substitution of the tetravalent oxides of zirconium and/or titanium and/or hafnium for one or more of the components of the extractable group. This not only results in controlling porosity by decreasing porosity without altering the amount of silica, but also results in more alkaline stable, porous silica-rich fibers.

The pore volume of the silica-rich fibers is controlled by balancing the glass batch formulation to yield hollow glass fibers that when leached to remove the components of the extractable group result in a desired mean pore volume. The desired mean pore diameter is controlled by providing or not providing heat treatment, and, if provided, heat treating at higher temperatures to increase the mean pore diameter. The number of pores is expressed as pore volume and surface area, and for discrete lengthy fibers, the volume should not be too large to destroy the fibrous shape over a discrete length. Such a length can range from that of chopped fibers up to any length that can be collected in the production of continuous glass fibers. As the discrete length of the glass fibers gets longer than chopped fibers, the pore volume should not extend beyond about 1.2 cc/gm and preferably 1.0 cc/gm. This maintains the discrete length of glass fiber and does not engender breakage of the discrete lengths to smaller lengths.

A particularly useful glass composition for increased porosity is a heat treatable glass for phase separation having a low silica and high-borate content. Generally, these glasses have present silica at 30 to 50 percent by weight, boric oxide at 40 to 55 percent by weight, alkali metal oxide at 5 to 15 percent by weight, aluminum oxide from 0 to 4 weight percent and zirconium oxide about 1 to about 4 weight percent.

Glass fiber compositions which do not require heat treatment for phase separation to generate pores of lower mean pore diameter on leaching are also useful. Such fiberizable glass compositions usually have boron-containing components of less than around 40 and preferably 30 weight percent. A suitable aluminum-alkali metal-borosilicate glass composition with zirconium oxide that does not require heat treatment and phase separation for extraction is one having in weight percent of the glass composition: $27B_2O_3$; $8.0Na_2O$; $60SiO_2$; $3.6ZrO_2$ and $1.4Al_2O_3$. Hollow glass fibers with this glass composition can result in porous hollow, silica-rich, zirconia-containing fibers having a low or high degree of porosity. The higher amount of boric oxide makes the glass phase separable upon heat treatment to obtain a high degree of porosity. Although this glass composition does not require heat treatment for extraction of the extractable components, pores can be generated in hollow glass fibers of any wall thickness for this composition with heat treatment, where the porosity is of a higher degree. The filament diameter can range from around one micron and greater than 25 microns up to 250 microns and more. Although for winding the filaments, it is preferred to have a diameter of not more than around 150 microns.

Another suitable aluminum borosilicate—Group IV metal-containing glass fiber composition for generating a lower degree of porosity is the "E-glass" or "621-glass" composition with zirconium oxide and/or titanium oxide and/or hafnium oxide. These modified hollow glass fiber compositions have in weight percent: 46–56 silica, 5–13 boric oxide, 10–17 aluminum oxide, 13–24 calcium oxide, 0 to 6 magnesium oxide, 2–6 zirconium oxide, 0 to 6 titanium oxide and/or hafnium oxide along with less than around 1 percent of both fluorine and ferric oxide and $R_2O$. The 621 glass differs from E-glass in the presence of magnesium oxide in the former. The E-glass in the absence of magnesium oxide has an increased amount of calcium oxide. Preferably, the modified 621-glass is modified with zirconium oxide that is substituted for some aluminum oxide. The preferred glass fiber composition in weight percent is: 52–56 silica, 5 to 8 boric oxide, greater than 22 to 24 calcium oxide, less than 12 aluminum oxide, 2–5 zirconium oxide with less than 1 weight percent of each of the following: fluorine, ferric oxide and sodium oxide. The extractable components can be removed from these glass fiber compositions through acid leaching without any heat treatment.

A suitable alkali metal silicate glass composition for forming hollow fibers has around 29 weight percent sodium oxide ($Na_2O$), 62 weight percent silica ($SiO_2$), and 9 weight percent zirconium oxide ($ZrO_2$). For these types of glass compositions, the amount of alkali metal oxide $R_2O$ can range from about 20 to about 40 weight percent and the amount of metal oxide of the Group IV metal can range from about 1 to about 20, preferably less than 12 weight percent $ZrO_2$, with the remainder being silica.

The glass batch compositions are melted in a furnace at temperatures and times to obtain a fiberizable viscosity for the molten glass without devitrification. Generally, the batch is heated to 2000° F. (1093° C.) to 3000° F. (1649° C.) for 1 to about 6 hours or longer. The molten glass is attenuated from the orifices of a bushing located on a forehearth connected to the furnace. The bushing has tubes aligned and associated with the orifices and connected to a supply of gas at a superatmospheric pressure to allow for a continuous or intermittent flow of gas to the vicinity of the orifice. The flow of gas can be uniform to produce continuous glass fibers, or can be intermittent to produce intermittent hollow glass fibers. A further description of the production of hollow and intermittent glass fibers is given for a direct melt system in U.S. Pat. Nos. 3,268,313; 3,421,873 and 3,526,487, all hereby incorporated herein by reference. The attenuation is conducted by mechanical means through winding or chopping, where in winding the fibers are grouped into a strand and wound onto a forming tube situated on a rotating mandrel of a winding apparatus. Any other method of forming and attenuating hollow fibers as known by those skilled in the art can also be used. As the fibers are attenuated they are cooled, and they can be treated with a chemical protecting agent, i.e., a sizing composition, before they are gathered into one or more strands and chopped or collected as continuous fibers or strands by any method known to those skilled in the art.

In forming the hollow glass fibers, the inner diameter of the fibers is effective to balance competing effects.

When hollow glass fibers with the glass composition of the present invention are not heat treated before being treated to remove extractable components, the rate of extraction is faster than when the fibers are heat treated. Also the non-heat-treated, hollow fibers result in hollow, porous fibers with smaller pore sizes than the heat-treated fibers. With any pore sizes, the unclogged effective pore size is important in certain applications of the hollow, porous fiber. For example, enzyme loading can be deleteriously affected by smaller than desired pore sizes. Clogging of pores of smaller size is a particular concern.

With hollow fibers that are subsequently treated to extract certain components by fluid extraction, the behavior of the extracting fluid in the lumen of the fiber is a factor in achieving a desired result. When the extracting fluid in the lumen becomes saturated with extractable materials, two deleterious effects occur. First, the extracted materials can precipitate and clog pores, especially small pores. Second, the pH of the extracting fluid can increase to result in non-acid extractable silica being removed from the lumen of the fiber. Both effects would result in pore sizes different from those produced by extraction from the exterior of the fiber. This would ultimately produce a hollow, porous fiber with heterogeneous pore sizes and possibly this could produce assymetrical hollow, porous fibers. It is preferred to minimize patulous extraction from the lumen of the hollow fiber.

The action to assert non-patulous extraction is performed by minimizing the inner diameter of the hollow fibers. The reduction in inner diameter results in a reduced surface area in the lumen and a reduced extraction rate from the lumen of the hollow fibers. This minimizing action competes with the effect that hollow fibers with small inner diameters are susceptible to poor extraction fluid exchange. This results in the build-up of extracted components possibly to the saturation level with its attendant deleterious effects that are to be avoided.

Hence, the formation of the hollow glass fibers should result in effective inner diameters of the lumen to balance these competing effects. The extraction fluid exchange rate during extraction is determined along with the length of the fibers to be subjected to extraction and the percent extractables in the glass composition and the concentration of the extracting fluid. With these determinations, the effective inner diameter can be calculated by considering their additive contributions.

Also in forming the hollow glass fibers, the environment within the lumen after formation must be considered in light of the subsequent extraction step. It is preferred to produce the hollow glass fibers so that a high humidity environment in the lumen of the fibers is avoided. The presence of high humidity in the lumen may decrease glass surface tension concomitantly increasing the volatility of boron from the lumen's surface. The extractability of fibers diminishes proportionately to the concentration of boron in the fibers. This would result in another cause of more heterogeneity in pore structure in the hollow, porous fibers.

With the outer diameter of the fibers ranging from around 1 micron to around 250 microns and with the K factor ID/OD ranging up to around 0.96, the effective inner diameter is generally in the range of less than around 0.5 up to around 240 microns.

The wall thickness of these hollow fibers do not correlate well with absolute thickness in extraction behavior. The K factor, fiber length, static or dynamic conditions of extraction, forming environment, extraction fluid concentration and flow rates and temperatures in the lumen all play a role in making the rate of extraction in the lumen different from the exterior rate of extraction.

The hollow glass fibers can have, and usually do have, a sizing composition applied to them which protects the glass fibers from interfilament abrasion in further processing steps. The sizing composition can be applied in art known quantities by any method known to those skilled in the art. The sizing composition is usually an aqueous composition with water soluble, dispersible or emulsifiable chemical agents that is placed on the glass fibers and remains on the glass fibers after the water and/or solvent is evaporated, but that may also be easily removable through solubility in a solvent like water. An example of a suitable water soluble chemical treatment is a cationic lubricant in water, which is applied to the glass fibers. A suitable cationic lubricant includes Cation X ® material, which is an alkyl imidazoline reaction product of tetraethylene pentamine and stearic acid. Other suitable material include textile softeners and cationic lubricants or agents generally known to those skilled in the art such as those disclosed in U.S. Pat. No. 4,002,445 (Graham) hereby incorporated by reference.

After the sizing composition is applied to the hollow glass fibers, the fibers are gathered into one or more strands, usually by means of a gathering shoe and then the glass fibers are wound onto a rotating drum-type winder having a forming tube to produce a forming package. The collet on which the forming package rides usually rotates at high speeds to collect the strand or strands into the forming package. Such speeds can be upward of 4,400 revolutions per minute which continues until the winder is slowed to a stop and a forming package is removed. An example of the sizing, gathering and collecting of the glass fibers into a forming package is disclosed in U.S. Pat. No. 4,071,339 (Griffiths) and U.S. Pat. No. 4,049,411 (Long and Dent) where attenuation speeds of from about 2,000 to 20,000 feet per second are achieved, both patents are hereby incorporated by reference.

The strands of the hollow glass fibers can comprise any number of fibers known to those skilled in the art. The hollow fibers can have outer diameters of around 1 micron up to 250 microns or more. Fibers with diameters larger than around 250 microns may be difficult to wind and may be formed in a manner similar to capillaries or tubes as is known in the art. The fibers can have a K factor of up to around 0.9 but preferably up to about 0.96. Best results are obtained when the hollowness of the glass fiber comprises around 10 to around 70 percent of the volume of the glass fibers. Fibers having more than 70 percent of their volume that is hollow can be unstable because of thin walls especially when the fibers are leached. Finer fibers with outer diameters of less than 40 microns are also accommodating to such volume percentages of hollowness.

The hollow glass fibers and/or strands that are collected into the forms of multilayered package, either forming packages or roving packages, or into the forms of chopped fibers or strands, chopped or continuous fiberous or strand mats or batts are treated for pore generation. The fibers or strands may be removed from the packages by cutting or rewinding onto larger diameter drums or can remain in the packages, mat, batt or chopped strand form for the generation of pores. Preferably the strands are cut from one or more multilayered packages by making one or more cuts through the layers in a lengthwise manner extending parallel to the lengthwise axis of the package. The length of the cut hollow glass fibers can be varied by varying the diameter of the forming package during winding of the hollow glass fibers or by rewinding the hollow glass fibers from the forming package onto a smaller or larger diameter package. The many layers of the hollow glass fibers which are removed from the package can be laid flat on a supporting surface. The supporting surface can be a plate or tray or moving conveyor belt. Generally, the discrete lengths of hollow glass fibers obtained by this approach can range from about 1 inch to around 25 inches. Any other method for removing the hollow glass fibers from the multilayered package can be employed. For example, the fibers can be unwound from the package and disposed as chopped strand or continuous strand onto another supporting surface or holder or rotating drum. Preferably, the discrete lengths of glass fibers can range from about 0.25 inch (64 cm) to around 70 inches (180 cm) and most preferably only up to around 25 inches (64 cm).

Before the pores are generated in the hollow glass fibers as fibers or strands through extraction, any sizing composition present can be removed through a solvent wash such as a water wash to remove a water soluble sizing composition. It is preferred not to remove the sizing composition from the glass fibers, since the sizing composition appears to play a protecting role in any heat treating and acid leaching steps used in extracting the extractable components in generating pores.

The extraction to generate pores can be generated in the glass fibers by several routes, depending upon the the glass fiber composition. The pores that are generated should have a diameter across some portion of the opening of the pore, whether the pore is circular, elliptical, cylindrical or asymmetrical in shape, to yield the desired mean pore diameter. The mean pore diameter of the pores generated can have a broad or narrow distribution.

Pores can be generated in the hollow glass fibers of the alkali metal borosilicate glass fiber composition having the Group IV metal oxide without heat treatment. For this manner of pore generation the amount of the components of the extractable group is greater than around 20-25 weight percent. Also the pore generation is independent of the outer diameter and wall thickness so even fibers with outer diameters greater than 25 microns can have pores generated in them without the necessity of heat treatment. An example of this type of hollow glass fibers is one having in weight percent $27B_2O_3$; $8.0Na_2O$; $60 SiO_2$; $3.6ZrO_2$; and $1.4Al_2O_3$. For hollow fibers having less than around 20-25 weight percent extractable components, the outer diameter of the fibers should be less than around 15 to about 20 microns for pores to be generated without heat treatment. In addition for hollow glass fibers having less than 20-25 weight percent extractable components, a wall thickness of around 15 microns or less regardless of the fiber diameter permits the generation of pores without heat treatment. Without heat treatment, the pores are generated by water and/or acid leaching for the higher boron-containing or alkali metal oxide containing glass fibers and acid leaching for fibers with lower amounts of these materials. Nonexclusive examples of hollow glass fibers with less than 20 weight percent extractables are modified "E-glass" and modified "621-glass" as fibers or strands. Hollow fibers of these compositions with the abovedescribed dimensions can be made porous through acid leaching without the necessity of heat treating prior to acid leaching.

Even though heat treatment for pore generation is not required of numerous types of hollow fiber glass compositions, the hollow fibers with greater than about 20 weight percent extractables can be heat treated. Heat treatment of these fibers brings the extractable components into interconnected phases and separates the nonextractable components into phases. This results in a greater mean pore diameter in the porous hollow fibers. For hollow glass fibers that are heat treatable for phase separation, the fibers are heat treated in a furnace or on a heated drum on which they were wound. The heat treatment is usually at a temperature greater than the annealing temperature and less than the softening point temperature of the glass. The temperature of heat treatment can assist in controlling the porosity of the glass fibers as taught for glass in U.S. Pat. No. 3,758,284 hereby incorporated by reference. The fibers can be water leached before they are acid leached, where the heat treatment, water leaching and acid leaching are conducted in accordance with the teachings of U.S. Pat. No. 3,843,341 hereby incorporated by reference. Some glass fibers with higher amounts of boron-containing material can have pores of sufficient dimensions generated by heat treatment for phase separation followed by water leaching alone. Other glass fibers having around 20 to less than 30 or 35 weight percent boron oxide or anhydride can have heat treatment for phase separation followed by water and/or acid leached or merely acid leached as described in U.S. Pat. Nos. 4,042,359; 2,106,744 and 3,485,687, all hereby incorporated by reference.

Generally, the phase separable, glass fibers are heat treated at a temperature in the range of about 420° C. to about 600° C. for a period of time from about 10 minutes to several days. Longer times require lower temperatures while shorter times require higher temperatures in these ranges. Most preferably, for porous, hollow silica-rich fibers having a pore volume of 0.7 cc/gm and an average pore diameter of 230 A, the fibers are heat treated at 540° C. for 6 hours to phase separate the glass into the water and/or acid leachable components and the acid insoluble components of the siliceous group. For the glass fibers with higher amounts of boron-containing materials, lower heat treating temperatures or the presence of a carbonaceous material like a dried sizing composition are useful to decrease any sticking together of the glass fibers. The presence of a protective size allows utilization of higher heat treating temperatures. Afterwards, the fibers are cooled to ambient temperatures.

The porous, hollow, silica-rich fibers of the invention, have around at least 75 weight percent silica with a minor amount of the Group IV metal oxide which is preferably a substantial portion, except for trace amounts of other metal oxides of the remainder of the silica-rich fiber composition. The fibers have a mean pore diameter which can be controlled to be in the range of about 10 to about 3,000 angstroms from the various aforementioned extraction operations. The lengths vary from the particulate to continuous fibers, where discrete lengths of fibers have a pore volume in the range of about 0.2 to about 1.2 cc/gm and fiber diameters from preferably about 3 microns to about 150 microns. To these porous silica-rich fibers, biochemically active material can be applied, where the material becomes associated with the fibers either by absorption directly onto the glass surface or by entrapment through precipitation or by covalent bonding through a linking agent, or by crosslinking with a crosslinking agent.

The porous, hollow, silica-rich fibers with the Group IVB metal oxide can be fashioned into nonporous hollow, silica-rich fibers with Group IV metal oxides. The porous fibers are condensed by heat treatment. The fibers are passed through a furnace or oven at a temperature from about 700° C. but less than the melting point of the silica-rich fibers. Preferably, the heat treatment is less than about 1100° C. The heat treatment dehydrates and shrinks the fibers to hollow nonporous silica-rich fibers with Group IV metal oxides.

The porous, hollow, silica-rich fibers with the Group IVB metal oxides have improved alkaline tolerance. Although the fibers are not completely immune or impervious to alkaline degradation, especially at high pH values; they do have improved alkaline tolerance over silica fibers.

PREFERRED EMBODIMENT OF THE INVENTION

The glass forming fiberizable pore generating batch composition is formulated by back calculations to result in hollow glass fiber compositions that need not be heat treatable for phase separation into the components of the extractable and nonextractable groups, and preferably the glass fibers have zirconium oxide or titanium oxide balanced with aluminum oxide in an alkali metal borosilicate fiber glass composition to result in porous fibers with good alkaline tolerance.

The glass fiber forming batch most preferably provides hollow fibers with a glass composition having about 27 weight percent $B_2O_3$, 8 weight percent $Na_2O$, 1.4 weight percent aluminum oxide and about 60 weight percent $SiO_2$ and 3.6 weight percent zirconium oxide. The hollow glass fibers are formed by melting the batch at about 2600° F. (1427° C.) for 3 hours and mechanically attenuating the hollow glass fibers after conditioning in the hollow fiber bushing melter at 2600° F. (1427° C.) for around one hour. The hollow fibers formed have a diameter in the range of about 3 microns to about 150 microns and most preferably about 10 microns to about 40 microns with a K factor of up to 0.90. The hollow glass fibers are sized with an aqueous chemical treating composition preferably having a film forming polymer like epoxy resin, which is water soluble, dispersible or emulsifiable, and water soluble lubricant like Cation-X ® lubricant and a compatible organosilane coupling agent like an epoxy silane. The fibers are gathered into one or more strands and wound into a cylindrical forming package.

A plurality of undried forming packages are cut along their longitudinal axes so that all of the layers of glass fibers can be removed from the package. These fibers are laid straight on trays in a nearly parallel alignment, where the fibers usually have a discrete length of about 25 inches (63.5 cm).

The hollow glass fibers are acid leached with agitation, in a dilute acid solution, such as 0.1 to about 3 Normal, preferably, about 2 to 3 Normal hydrochloric acid, at temperatures around 80° C. to 100° C., preferably 90° C., for about 10 minutes to about 8 hours, preferably about 2 to about 4 hours. In the acid leach, the hollow glass fibers are immersed in the acid bath for a sufficient period of time, at a sufficient temperature to remove a substantial amount, if not all, of the acid soluble boron-containing compounds in the glass fibers. The fibers typically may be submerged in the acid, when the acid is cool, and the temperature of the acid is increased to the elevated temperature. Nonexclusive examples of other suitable dilute solutions of acids include sulfuric and nitric acid, or organic acids such as oxalic acid. The volume ratio of acid to glass fibers in the acid leaching step can be about 1 to about 8 volumes of acid of one volume of hollow glass fibers which will vary somewhat with the normality of the acid. The hollow, silica-rich fibers are removed from the acid leaching solution, water washed to a pH of around 5.5 to neutral in the wash water after which the fibers are dried, preferably in air drying at around 90° C. for around 10 minutes to about 24 hours.

If the aqueous sizing composition has not been removed prior to acid leaching, as it preferably is not, the porous, silica-rich fibers are subjected to air oxidation. This removes any carbonaceous residue in the pores that may result from the sizing composition being present on the glass fibers during acid leaching for extraction of the extractable components. The temperature of oxidation is that sufficient to oxidize carbon in the presence of an adequate amount of oxygen preferably provided by flowing dry reconstituted air. It is most preferred that the oxidation be conducted at around 1000° F. (537° C.) or higher for about 20 minutes up to about 2 hours. The oxidation temperature should not be of such magnitude that the glass revitrifies and closes most of the pores or significantly reduces the strength of the porous fibers.

The invention along with alternative embodiments are illustrated further in the following examples.

EXAMPLES

TABLE I

| SAMPLES | WEIGHT % | | | | | |
|---|---|---|---|---|---|---|
| | $B_2O_3$ | $Na_2O$ | $SiO_2$ | $ZrO_2$ | $Al_2O_3$ | CaO |
| 1 | 27.0 | 8.0 | 60.0 | 3.6 | 1.4 | — |
| 2 | 7.2 | 1 | 54.0 | 3.6 | 10.7 | — |
| 3 | 54.0 | 8.0 | 35.0 | 3 | — | — |
| 4 | 0 | 29 | 62 | 9 | — | — |
| Illus. Ex. | 7.2 | 1.0 | 54.0 | — | 14.3 | 22.4 |

Hollow glass fibers can be made having the glass compositions of Samples 1–4 listed in Table 1 to produce porous, hollow, silica-rich fibers. The hollow glass fibers formed with the glass compositions of the Illustrative Example would produce porous, hollow, silica-rich fibers that are not alkaline tolerant. Hollow glass fibers of Samples 2–4 and the Illustrative Example can produce porous, hollow, silica-rich fibers in a manner similar to that for Sample 1 as explained in Example 1.

EXAMPLE 1

The Sample 1 glass composition of Table 1 was produced by melting glass forming batch calculated to yield the desired quantities of oxides melted at a temperature of 2600° F. (1427° C.) for 3 hours in platinum crucibles. The melt was cooled and crushed into approximately 0.5 inch (1.27 cm) pieces and charges into a 4 tip hollow fiber bushing. The fibers were drawn on an 8″ collet (20.32 cm) rotating at 135 RPM after a 1 hour conditioning in the bushing melter at 2600° F. (1427° C.) to reduce the seed content of the glass. Air flow to the tips was set at 0.5 ft³/min (cfm) (0.0002 m²/sec). The fiber physical dimensions were:

Outer diameter (OD) = 77 microns
Inner diameter (ID) = 38.5 microns
K = 0.5 (K = ID/OD)

The fibers were cut from the package in 25″ (63.5 cm) lengths. Without heat treatment, the fibers were leached in 3N HCl for 1 hour at 95° C.

The fibers were water washed with distilled water until a pH of 5.6 was achieved. The total weight loss was 36% with a glass fiber composition of 95% $SiO_2$, 5% $ZrO_2$. The pore size averaged from around 8 to about 20 Å with a surface area of 400+ m²/gm.

EXAMPLE 2

Porous hollow, silica-rich fibers were made from the glass fibers of Sample 1. Also porous, hollow fibers were prepared from glass fibers having a Vycor glass composition of around 53 to 72 percent by weight $SiO_2$, 20 to 35 percent by weight $B_2O_3$ and 4 to 12 percent by weight $Na_2O$. The hollow glass fibers of Sample 1 had a 20 micron outside diameter and a 12 micron inside diameter for a K factor of 0.6. The hollow glass fibers of the Vycore glass composition had an outside diameter of 19 microns and an inside diameter of 12 microns for a K factor of 0.63. Both hollow glass fiber samples were leached in an acid bath of 3N hydrochloric acid at 95° C. for two hours and water washed. A 25 gram sample of hollow silica-rich fibers from Sample 1 and a 34 gram sample of hollow, silica-rich fibers from the Vycore composition were immersed in a 1.5 Normal sodium hydroxide. The samples remain in the basic solution having a pH of about 15 for 3.5 hours. After this time porous, hollow silica-rich fibers of the Vycore composition were completely disintegrated. The porous hollow, silica-rich fibers of Sample 1 still were porous hollow fibers of the same length as originally subjected to the alkaline solution.

I claim:

1. Process of producing porous, hollow, silica-rich fibers with alkaline tolerance and controlled porosity, comprising:
    a. forming hollow glass fibers having a glass composition of an alkali metal borosilicate and an oxide of a metal from Group IVB of the Periodic Chart having in weight percent of the glass composition:
        1. at least one fluxing agent selected from the group consisting of boron-containing material in an amount from 0 to around 60, and alkali metal oxide from around 1 to about 40 and mixtures thereof where the amount of fluxing agent is at least an effective fluxing amount,
        2. oxide of a metal from Group IVB of the Periodic Table about 1 to about 20,
        3. aluminum oxide from 0 to about 15,
        4. alkaline earth metal oxide from about 0 to about 30,
        5. silica from at least about 25 to around 80, the amount of extractable components is at least 10 volume percent of the glass fibers and wherein the hollow glass fibers have an outer diameter from around 1 to around 250 micrometers, and a K factor of 0.002 up to around 0.96 and an effective internal diameter in the range of around 0.5 to around 240 micrometers, and
    b. extracting extractable components from the nonheat-treated fibers with leaching compounds selected from the group consisting of: acids other than hydrofluoric and phosphoric for the hollow glass fibers including those having less than 25 weight percent extractables when their wall thickness is less than around 15 microns, and water for a first leaching step and acids other than hydrofluoric and phosphoric for a second leaching step, and water for hollow glass fibers having higher amounts of boron containing material or of alkali metal oxides, wherein extraction is conducted to balance the effective internal diameter of the hollow fibers in conjunction with fiber length with the concentration of the leaching compound in the extracting solution, any extracting solution fluid flow rates, and percent extractables in the glass fibers to minimize the extraction in the lumen of the hollow fibers thereby retarding both the deposition of extracted components as a precipitate and the extraction of silica in the lumen of the hollow glass fibers to impart controlled porosity in producing the porous, hollow, silica-rich fibers containing one or more oxides of the Group IVB metals.

2. Process of claim 1, wherein the formed glass fibers have a composition of 29 weight percent sodium oxide, 62 weight percent silica, and 9 weight percent zirconium oxide.

3. Process of claim 1, wherein the formed hollow fibers have hollowness of around 10 to around 70 volume percent of the hollow glass fibers.

4. Process of claim 1, wherein the formed hollow fibers have a length in the range of 0.25 inch (0.64 cm) to 70 inches (180 cm).

5. Process of claim 1, wherein the extraction is performed with acid selected from the group consisting of hydrochloric, sulfuric, nitric and oxalic.

6. Process of claim 1, wherein the formed glass fibers have a composition of 27 weight percent boric oxide, 8 weight percent sodium oxide, 60 weight percent silica, 3.6 weight percent zirconium oxide, and 1.4 weight percent aluminum oxide, and extraction is performed with an acid other than hydrofluoric and phosphoric acids.

7. Process of claim 1, wherein the formed glass composition has 7.2 weight percent boric oxide, 54 weight percent silica, 22.4 weight percent calcium oxide, 10.7 weight percent aluminum oxide, 3.6 weight percent zirconium oxide and 0.7 weight percent fluorine.

8. Process of claim 1, wherein the glass fibers have a filament outer diameter of greater than 25.4 microns to less than 250 microns.

9. Process of claim 1, wherein the glass fibers having an amount of boron-containing material greater than 40 weight percent and are heat treated at lower temperatures.

10. Process of claim 1, wherein forming includes attenuating the fibers from orifices in a bushing, contacting the fibers with an aqueous chemical treating composition, gathering the fibers into one or more strands and winding the strands into a cylindrical multi-layered package.

11. Process of claim 1, wherein the porous glass fibers have a pore volume in the range of about 0.2 to about 1.2 cc/gm.

12. Process of claim 1, wherein the formed hollow glass fibers are chopped and the chopped extracted to produce porous, silica-rich fibers have a length from less than ⅛ of an inch to less than continuous lengths.

13. Process of producing porous, hollow, silica-rich fibers with alkaline tolerance and controlled porosity, comprising:
    a. forming hollow glass fibers having a glass composition of an alkali metal borosilicate and an oxide of a metal from Group IVB of the periodic chart having in weight percent of the glass composition:
        1. silica in an amount greater than 72 weight percent to less than around 80 weight percent,
        2. oxide of a metal from Group IVB of the periodic table in an amount from around 1 to about 6 weight percent,
        3. the remaining portion of the fiberizable glass is comprised of at least one fluxing agent selected from the group consisting of boron-containing material and alkali metal oxide, where the amount of the fluxing agent is at least an effective fluxing amount, aluminum oxide in an amount from about 0 to about 15 weight percent, and the amount of extractable components is at least 10 volume percent of the glass fibers, and wherein the hollow glass fibers have an outer diameter from greater than 25.4 up to around 250 microns and a K factor of 0.002 up to around 0.96 in an effective internal diameter in the range of around 0.5 to around 240 micrometers, b. heat treating the hollow glass fibers to phase separate the extractable components from the nonextractable components at a temperature in the range of about 420° C. to about 600° C. for a period of time from about 10 minutes to several days, and c. leaching the phase separated extractable components by acid leaching with acids other than hydrofluoric and phosphoric acids.

14. Process of claim 1, wherein the amount of silica in the hollow glass fibers before extraction range from 30 to 70 weight percent.

15. Process of claim 1 producing an alkaline tolerant, porous hollow, silica-rich fibers with controlled porosity, wherein the hollow glass fibers having a K factor of 0.002 up to around 0.96 are formed of a glass composition of alkali metal borosilicate, having a tetravalent oxide of a metal from Group IVB of the Periodic Chart, comprising:
 1. aluminum oxide from around 0.1 to about 15,
 2. tetravalent oxide of a metal from Group IVB of the Periodic Chart about 1 to about 20,
 3. alkali metal oxide from 20 to about 40,
 4. alkaline earth metal oxides from about 0 to about 30, and
 5. silica from at least about 25 to around 80, and extraction is by leaching water and/or acid extractable components including any associated aluminum oxide from the fibers to produce porous, hollow silica-rich fibers containing metal from Group IVB of the Periodic Chart.

16. Process of claim 15, which includes heating the porous, silica-rich fibers to reconsolidate the fibers to produce solid, nonporous, silica-rich fibers having oxides from at least one metal of Group IV of the Periodic Chart.

17. Process of claim 15, wherein the glass fibers have a filament outer diameter of greater than 25.4 microns to less than 250 microns.

18. Process of claim 15, wherein the K factor is in the range of 0.5 up to 0.9.

19. Process of claim 1, wherein the oxide of a metal of Group IVB of the Periodic Table is selected from refractory glass modifiers of tetravalent oxides of zirconium, titanium, and hafnium or mixtures thereof.

20. Process of claim 1 producing an alkaline tolerant, porous, hollow silica-rich fibers, wherein the hollow glass fibers having a K factor of 0.002 up to around 0.96 are formed with of a glass composition of aluminum borosilicate, having a tetravalent oxide of a metal from Group IVB of the Periodic Chart having in weight percent, comprising:
 1. boron-containing material from around 8 to 13,
 2. aluminum oxide from around 12 to 16,
 3. tetravalent oxide of a metal from Group IVB of the Periodic Chart from about 1 to about 20,
 4. alkaline earth metal oxides from 16 to 25, and
 5. silica from 52 to 56,
and wherein extraction is by acid leaching of the hollow glass fibers to extract acid extractable components including any associated aluminum oxide from the fibers to produce porous, hollow silica-rich fibers containing a metal from Group IVB of the Periodic Chart.

21. Process of claim 20, which includes heating the porous, hollow silica-rich fibers to reconsolidate the fibers to produce hollow, nonporous, silica-rich fibers having oxides from one or more metals of Group IVB of the Periodic Chart.

22. Process of claim 1, wherein forming is conducted to minimize the presence of high humidity in the lumen of the hollow fibers.

* * * * *

UNITED STATES PATENT AND TRADEMARK OFFICE
CERTIFICATE OF CORRECTION

PATENT NO. : 4,778,499
DATED : October 18, 1988
INVENTOR(S) : Richard P. Beaver

It is certified that error appears in the above-identified patent and that said Letters Patent is hereby corrected as shown below:

Column 14, line 40, after the word "chopped" insert --fibers are--.

Column 16, line 13, after the word "formed" delete the word 'with'.

Signed and Sealed this

Eighth Day of August, 1989

Attest:

DONALD J. QUIGG

Attesting Officer

Commissioner of Patents and Trademarks